US012806637B2

(12) United States Patent
Olsowski

(10) Patent No.: US 12,806,637 B2
(45) Date of Patent: Nov. 24, 2026

(54) PORTABLE FAN

(71) Applicant: Scott Olsowski, Stuart, FL (US)

(72) Inventor: Scott Olsowski, Stuart, FL (US)

( * ) Notice: Subject to any disclaimer, the term of this patent is extended or adjusted under 35 U.S.C. 154(b) by 302 days.

(21) Appl. No.: 18/672,163

(22) Filed: May 23, 2024

(65) Prior Publication Data

US 2025/0360522 A1 Nov. 27, 2025

(51) Int. Cl.
*B05B 3/02* (2006.01)
*B01F 23/21* (2022.01)
*B01F 23/213* (2022.01)

(52) U.S. Cl.
CPC ...... *B05B 3/0204* (2025.08); *B01F 23/21312* (2022.01); *B01F 23/21321* (2022.01)

(58) Field of Classification Search
CPC .. B01F 23/21; B01F 23/213; B01F 23/21321; B01F 23/21312; B01D 23/21; B01D 23/213; B01D 23/21321
See application file for complete search history.

(56) References Cited

U.S. PATENT DOCUMENTS 2,653,803 A 9/1953 Baner
6,588,372 B1 * 7/2003 Terrell .................. F24F 5/0035 261/28
7,510,170 B2 3/2009 Huang
7,677,054 B2 3/2010 Dos Santos
D680,209 S 4/2013 Yen
D688,726 S 8/2013 Samuels
9,091,452 B2 7/2015 Yen
9,267,698 B2 2/2016 Stearns
9,765,982 B2 9/2017 Escalettes et al.
10,576,905 B1 3/2020 MacNeil et al.
D992,719 S 7/2023 Lin et al.
11,953,256 B2 4/2024 Barlettano
2009/0014556 A1 1/2009 Gokal
(Continued)

FOREIGN PATENT DOCUMENTS

CN 204061228 U * 12/2014
CN 205747278 11/2016
(Continued)

OTHER PUBLICATIONS

Design U.S. Pat. No. D. 101,4729 ; issued Feb. 13, 2024; Huizhou Dahe Ind Co Ltd.

*Primary Examiner* — Robert A Hopkins
(74) *Attorney, Agent, or Firm* — Simpson & Simpson, PLLC

(57) ABSTRACT

A portable misting fan including a body having interconnected upper and lower sections thereby circumferentially defining a passageway with respective open ends therebetween, said upper section comprising an arcuate internal reservoir therein, said internal reservoir having an inlet and at least one outlet, a fan assembly arranged at least partially within said passageway, a sonic disk in communication with said at least one outlet and positioned in front of said fan assembly, and a mounting arm pivotably connected to said body about an axis perpendicularly arranged with respect to said open ends of said passageway, where the sonic disk assembly is designed to selectably atomize and disperse water—the water communicated from the internal reservoir—from the sonic disk assembly in a continuous or intermittent manner.

14 Claims, 9 Drawing Sheets

(56) References Cited

U.S. PATENT DOCUMENTS

| | | | |
|---|---|---|---|
| 2015/0054181 | A1 | 2/2015 | Martin et al. |
| 2021/0293425 | A1 | 9/2021 | Ma |
| 2022/0080437 | A1 | 3/2022 | Zhong |

FOREIGN PATENT DOCUMENTS

| | | |
|---|---|---|
| CN | 206668591 | 11/2017 |
| CN | 210290192 | 4/2020 |
| CN | 212006065 | 11/2020 |
| CN | 218894802 | 4/2023 |
| EP | 3948097 | 2/2022 |

* cited by examiner

PORTABLE FAN

FIELD

The present invention relates to a portable fan, specifically a portable misting fan having an internal and integrated water reservoir.

BACKGROUND

Misting fans are known in the art. Examples include hand-held powered fans, which are also connected to a water reservoir, where the reservoir includes a manual pump allowing water to be sprayed from the reservoir into the wind-path created by the fan, thereby producing a misting effect of the pumped water in the direction of the wind-path.

Other known versions include industrial type fans, which can be commonly seen at sporting events hosted in arid weather conditions. These industrial misting fans are typically large and require a corded power supply. In some configurations, these industrial misting fans are also arranged in fixed positions or alternatively, are arranged on large transportation devices, i.e., a stand having wheels, where the stand needs to be of a sufficient size to accommodate the industrial misting fan and also support a proper-upright position of the fan. The fluid reservoir is also large, or alternatively, may be directly connected to a constant water supply.

Both of these known versions of the misting fan are either too simple and require physical actuation, or are too complex, large, and are tied to an external power supply for continuous use.

Therefore, there is a long-felt need for a portable and powered misting fan, which includes an onboard power supply, e.g., a battery, an interchangeable and portable mounting system, a convenient reservoir integrated into the misting fan, and adjustability of not only the wind-force of the fan, but also adjustability of the misting-rate, i.e., continuous, intermittent, none, and the wind-force, i.e., different speeds.

SUMMARY

According to aspects herein, the present invention generally comprises a portable misting fan including a body having interconnected upper and lower sections thereby circumferentially defining a passageway with respective open ends therebetween, said upper section comprising an arcuate internal reservoir therein, said internal reservoir having an inlet and at least one outlet, a fan assembly arranged at least partially within said passageway, a sonic disk in communication with said at least one outlet and positioned in front of said fan assembly, and a mounting arm pivotably connected to said body about an axis perpendicularly arranged with respect to said open ends of said passageway, where the sonic disk assembly is designed to selectably atomize and disperse water—the water communicated from the internal reservoir—from the sonic disk assembly in one or more of a continuous or intermittent manner.

In some embodiments, the aforementioned portable misting fan further comprises a battery in communication with the fan assembly.

In other configurations, the aforementioned portable misting fan further comprises mounting means removably connected to a distal end of the mounting arm, where the mounting means comprise one or more of a movably connected clamp, a magnet, a movably connected suction cup, or a movably connected cup-holder mount, i.e., a body arranged to be at least partially seated within a cup holder which can removably connect to the mounting arm. In other words, the mounting means may comprise any combination, sub-combination, and/or partial combination, of the components and/or sub-components of the aforementioned.

In a preferable embodiment, the aforementioned portable misting fan further comprises a first, second, and third outlet, which outlets are in communication with the sonic disk.

In some embodiments, the aforementioned portable misting fan further comprises a controller, or microcontroller, in communication with the fan assembly and the sonic disk assembly, the controller adapted to toggle power to the fan assembly and to toggle activation of the sonic disk assembly.

In one possible arrangement, the present invention may comprise a portable misting fan having a body having interconnected upper and lower sections thereby circumferentially defining a passageway with respective open ends therebetween, the upper section comprising an arcuate internal reservoir therein, the internal reservoir having: an inlet; a first outlet; a second outlet; and, a third outlet, a perforated faceplate having a dispensing aperture arranged therein, the faceplate arranged to substantially cover and be removably connected to one of the open ends, a perforated backplate having an aperture therein, the backplate arranged to substantially cover to one of the open ends opposite said perforated faceplate, a fan assembly arranged at least partially within the passageway and connected to the perforated backplate within the aperture of the backplate, a sonic disk assembly in communication with the outlets and positioned in front of the fan assembly proximate the front perforated faceplate, and wherein the sonic disk assembly is adapted to selectably atomize and disperse water, communicated from the internal reservoir, therefrom in one or more of a continuous or intermittent manner through the dispensing aperture of the faceplate.

These and other objects, features, and advantages of the present invention will become readily apparent upon a review of the following detailed description of the invention, in view of the drawings and appended claims.

BRIEF DESCRIPTION

Various embodiments are disclosed, by way of example only, with reference to the accompanying drawings in which corresponding reference symbols indicate corresponding parts, in which:

FIGS. 1A and 1B generally show perspective views of the present invention;

DETAILED DESCRIPTION

Figure 1B:
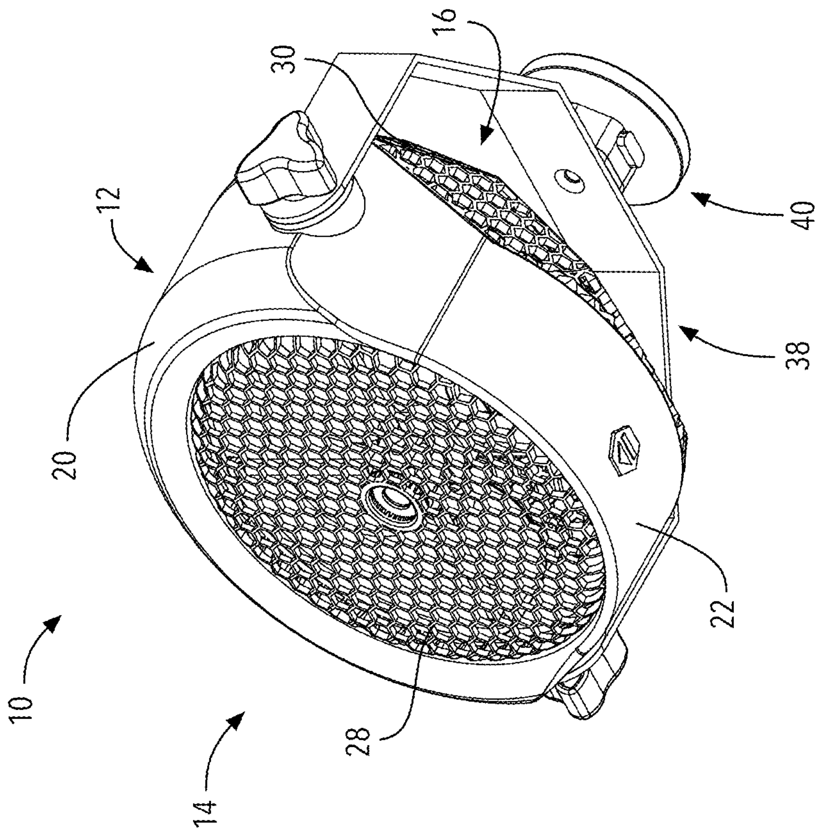

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims. Those in the art will understand that any suitable material, now known, or hereafter developed, may be used in forming the present invention described herein.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be noted that the terms "including", "includes", "having", "has", "contains", and/or "containing", should be interpreted as being substantially synonymous with the terms "comprising" and/or "comprises".

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

In reference to FIGS. 1A through 2B, which collectively show perspective views of the present invention, portable misting fan 10 (hereinafter "fan 10"). Generally, fan 10 may include body 12 having front end 14 and back end 16, and with interconnected, i.e., integral, upper section 20 and lower section 22 which circumferentially define passageway 18 extending therethrough. Passageway 18 is bounded by two openings at respective ends, which openings accept perforated grates 28 and 30 therein. First opening 24 of passageway 18 is shown in FIGS. 2A and 2B. First axis AX1 extends longitudinally through a substantially center position of passageway 18 and both of the openings thereof.

As shown in FIGS. 2A and 2B, fan assembly 34 is arranged within passageway 18 and is preferably mounted to and extends from grate 30. Fan assembly 34 includes fan 36 having a plurality of fan blades. Sonic disk assembly 32 is positioned in front of fan 36 within passageway 18, i.e., arranged proximate first opening 24. Preferably, a center point of fan 36 is arranged on first axis AX1 and a center point of sonic disk assembly 32 is also arranged on first axis AX1.

Mounting arm assembly 38 is pivotally and removably connected to body 12 and is arranged to rotate about second axis AX2. Preferably, mounting arm 38 extends distally from body 12 and includes mounting device 40 removably connected to its distal end.

Figure 3:
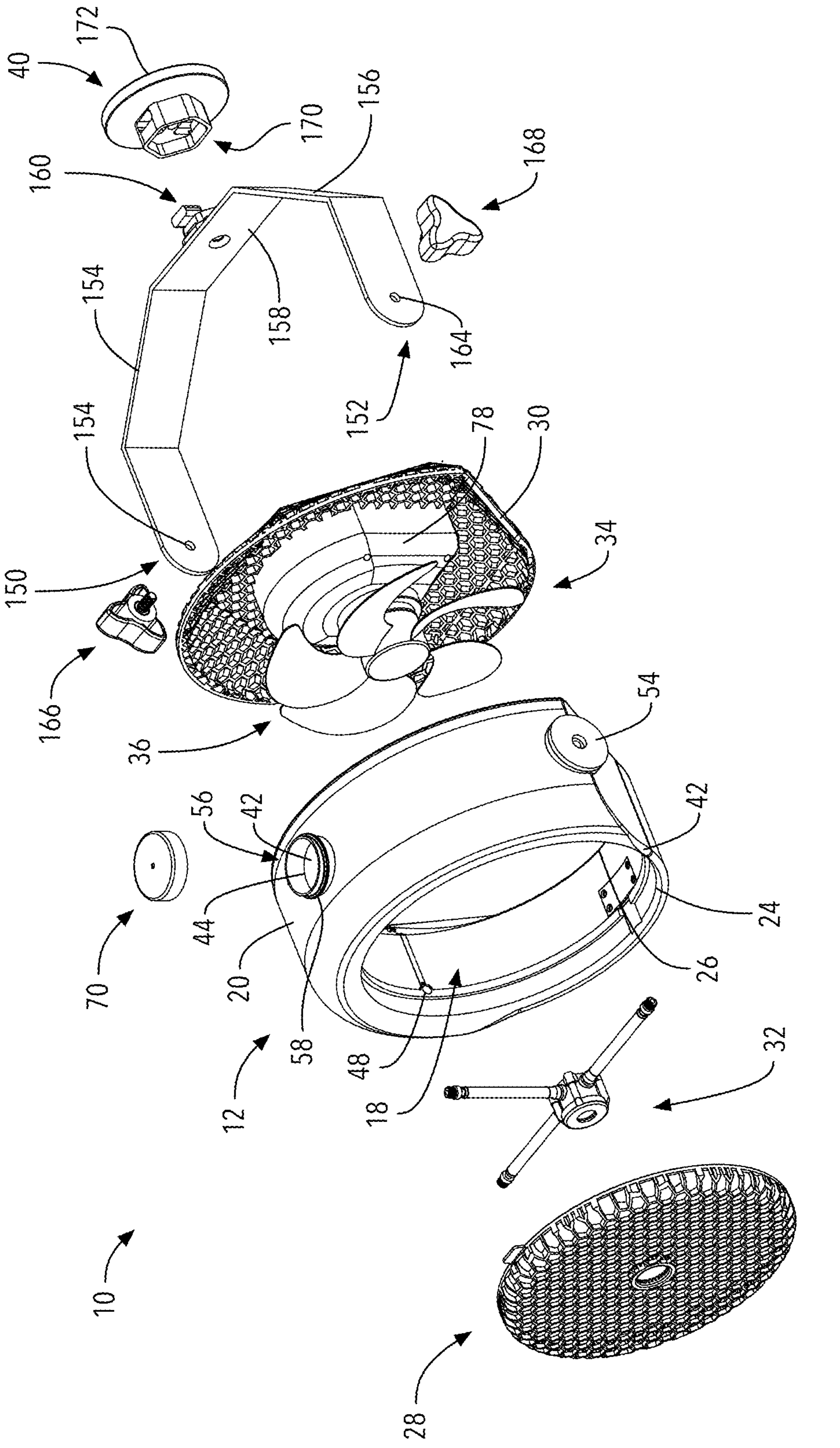
FIG. 3 is an exploded view of the invention shown in FIG. 1A.

In reference to the aforementioned figures and FIG. 3, passageway 18 includes oppositely arranged openings, opening 24 and opening 26, where opening 24 is a front opening and opening 26 is a rear opening. Arranged within upper section 20 of body 12 is arcuate internal reservoir 42 (discussed further, infra), which has proximal inlet 44 substantially arrange within mouth 56 that protrudes from a top of upper section 20. Mouth 56 may include threading 58 thereon allowing cap 70 to be threadably secured to mouth 56, thereby sealing internal reservoir 42.

In a preferred embodiment, mounting arm assembly 38 is removably and pivotably connected to body 12 at mounting sections 52 and 54 (both shown in FIG. 4B), where the mounting sections extend from both upper section 20 and lower section 22 from opposite sides thereof. Preferably, the mounting sections each having an aperture arranged therein where the apertures are centered about second axis AX2. In one possible arrangement, mounting arm assembly 38 includes base 158 having first arm 154 and second arm 156 extending therefrom. First arm 154 terminates at end 150 and second arm terminates at end 152, whereas ends 150 and 152 are arranged distally from base 158. End 150 includes mounting aperture 162 therein and end 152 includes mounting aperture 164 therein. Mounting apertures 162 and 164 are arranged to align with mounting sections 52 and 54, where threaded connectors 166 and 168 engage both mounting apertures 162 and 164 and the apertures of the mounting sections to removably and pivotably secure mounting arm assembly to body 12. It should be noted that any acceptable connector type may be used to removably secure mounting arm assembly 38 to body 12, so long as alternative connector types allow ends 150 and 152 to rotate about axis AX2. Connector 160 is secured to base 158 and extends in an opposite direction of arms 154 and 156. Connector 160 is arranged to removable engage connector of mounting device 40, where mounting device 40 is shown having magnet 172 attached and extending from connector 170. Mounting device 40 is discussed in greater detail in view of FIGS. 7A and 7B, infra.

In a preferred embodiment, perforated grate 28, i.e., a first faceplate, is arranged to removably secure within opening 24 of body 12 and perforated grate 30 is arranged to either removably or fixedly secure (via fasteners) within opening 26 of body 12. Perforated grate 30 generally houses fan assembly 34 which includes motor 48 and fan 36. Perforated grate 30 and fan assembly 34 are discussed in greater detail in view of FIGS. 5A and 5B, infra.

Figure 4B:
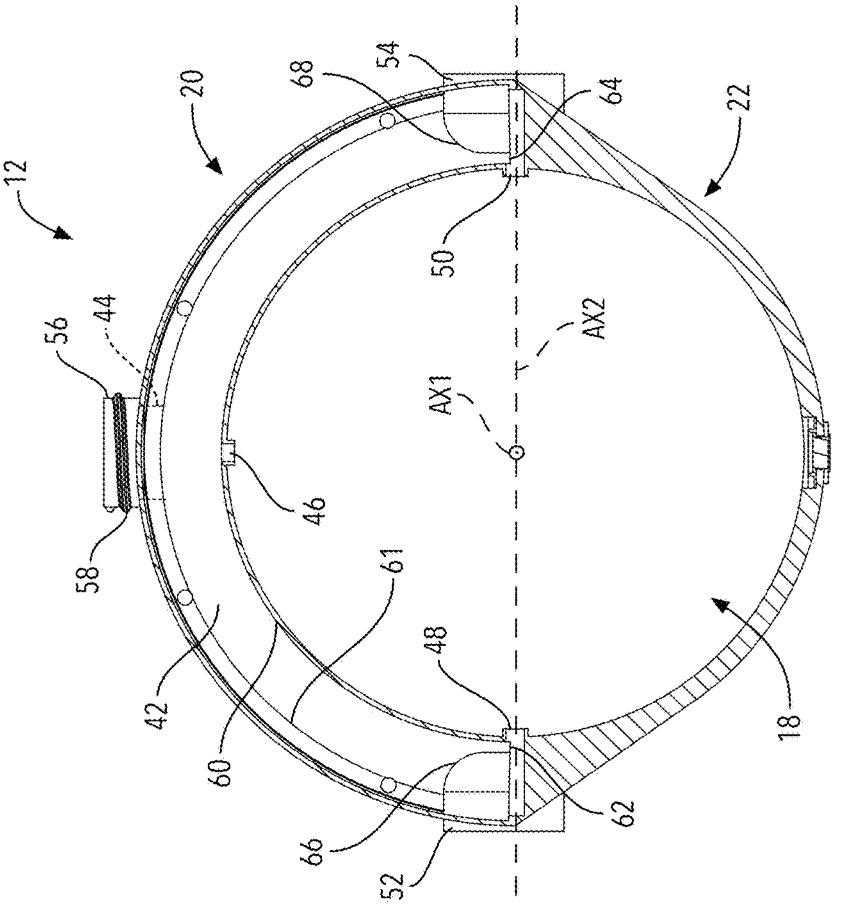
FIG. 4B is a cross-sectional view taken generally along line 4B-4B in FIG. 4A.
Figure 4A:
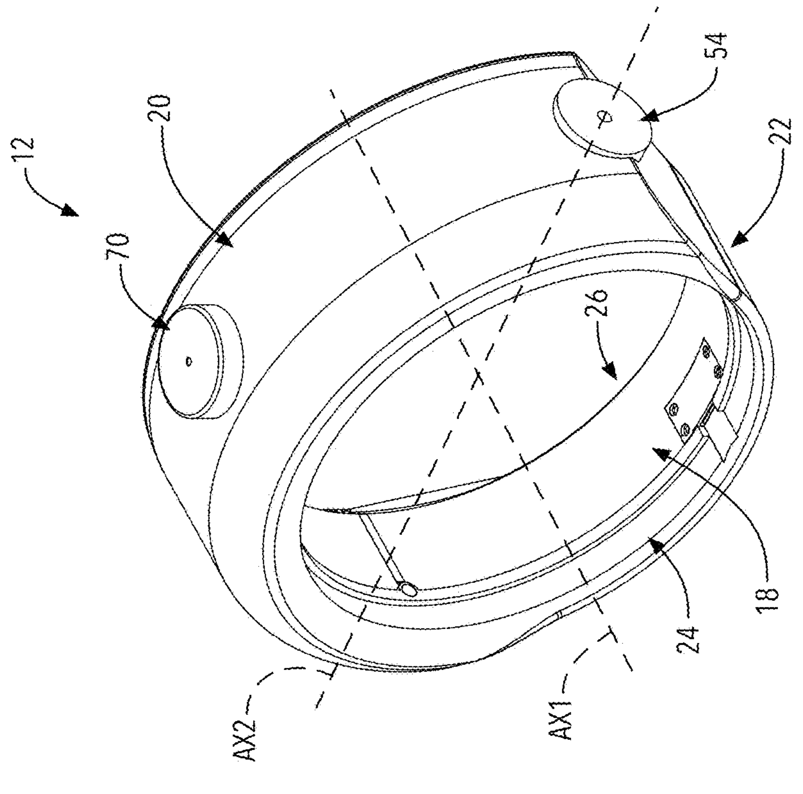
FIG. 4A is a perspective view of the main body of the invention shown in FIG. 1A.

FIGS. 4A and 4B show body 12 in an isolated perspective view and a cross-sectional taken generally along line 4B-4B. As discussed supra, mounting sections 52 and 54 extend from opposite sides of body 12 and substantially arranged between upper section 22 and lower section 24 of body 12, such that mounting apertures arranged therein are substantially colinear and arranged along axis AX2. As shown in FIG. 4B, upper section 22 includes arcuate internal reservoir 42 therein. Reservoir 42 is in communication with inlet 44, first distal inlet 62, second distal inlet 64, outlets 46, 48, and 50. Reservoir 42 is bounded by reservoir floor 60, upper surface 61, slope 66, and slope 68. Slopes 66 and 68 extend from upper surface 61. Distal inlet 62 is arranged proximate lower section 22 and is formed between slope 66 and reservoir floor 60 and distal inlet 64 is arranged proximate lower section 22, opposite distal inlet 62, and is formed between slope 68 and reservoir floor 60. Distal inlets 62 and 64 are in communication with outlets 48 and 50. The aforementioned arrangement of outlets 46, 48, and 50, being arranged distally in relation to inlet 44, allow gravity to carry water arranged within outlet to one or more of outlets 46, 48, and 50, such that if body 12 is rotated about axis AX1 or AX2 (via the mounting arm assembly), water within reservoir 42 will flow through one or more of outlets 46, 48, and 50. The arrangement of distal inlets 62 and 64 (which are in communication with outlets 48 and 50) between slopes 66 and 68 and reservoir floor 60 ensure that once a water level within reservoir 42 is lower than outlet 46, the water will still be able to flow, via gravity, into outlets 48 and 50. Thus, the curvature or arcuate configuration of reservoir floor 60, upper surface 61, and slopes 66 and 68 substantially creates a pair of funnels for water flowing through distal inlets 62 and 64 into outlets 48 and 50.

Figure 5B:
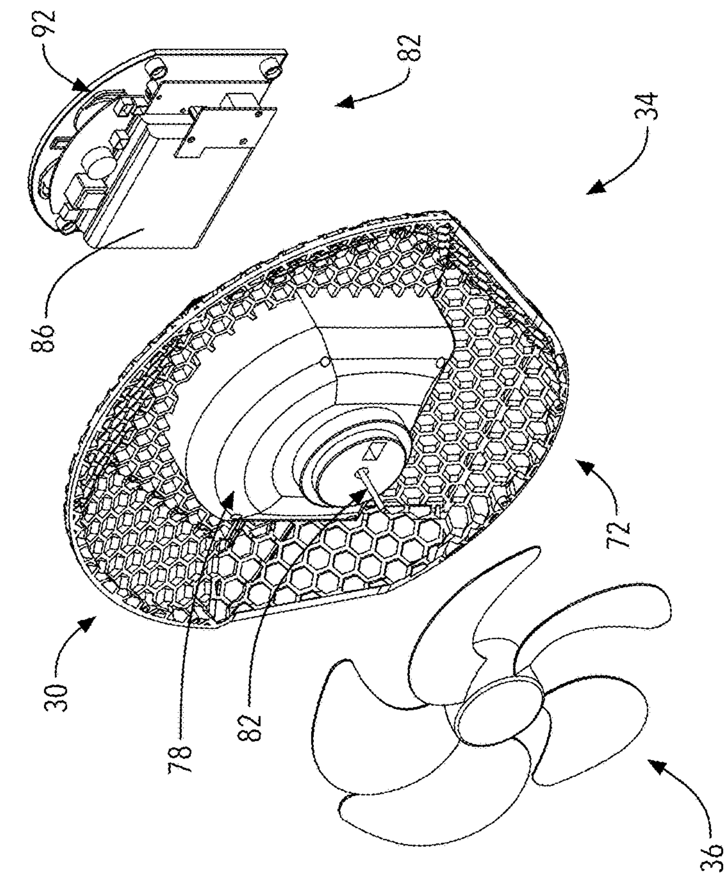
FIGS. 5A and 5B are exploded views of the fan assembly of the invention shown in FIG. 1A.
Figure 5A:
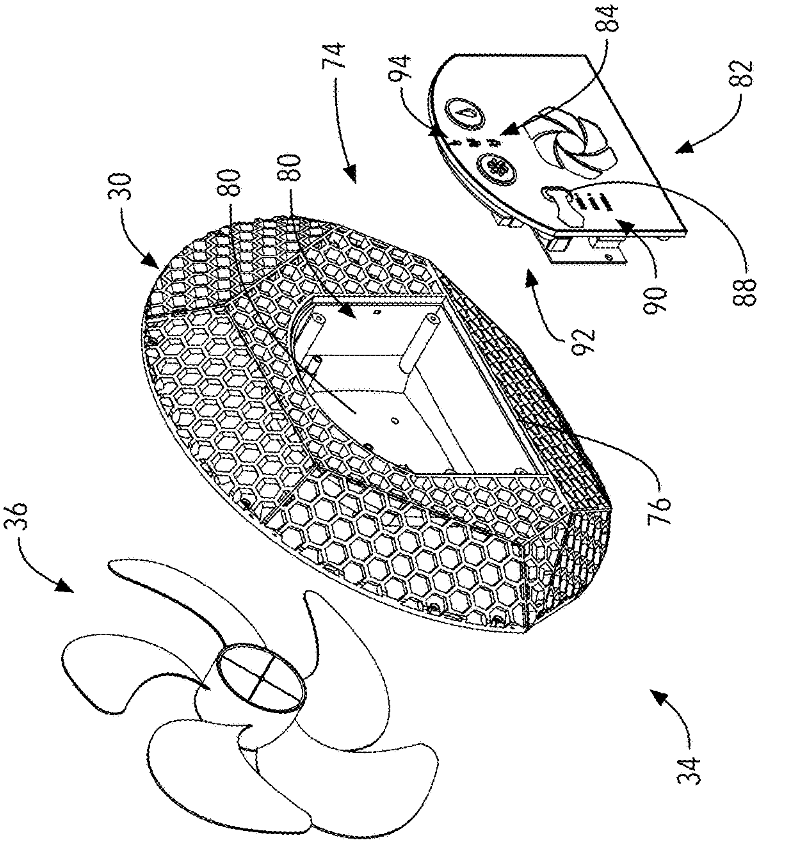

FIGS. 5A and 5B show exploded perspective views of fan assembly 34 and perforated grate 30. In a preferred embodiment, perforated grate (or backplate) 30 includes aperture 76 therein. Aperture 76 is arranged to accept motor assembly 78 of fan assembly 34 therein, preferably via a plurality of apertures, thusly allowing fan assembly 34 to be removed from grate 30. In one possible embodiment, motor assembly 78 comprises a brushless DC motor which is arranged within at least a water resistant and/or waterproof housing/shroud and having drive shaft 82 extending from an opposite end of cavity 80. Drive shaft 82 is arranged to accept fan 36 thereon. Cavity 80, or component housing, is arranged to accept control board 82 therein, which may be secured therein via fasteners or the like. Control board 82 generally includes plurality of inputs 84, e.g., on/off fan power toggles and/or continuous/intermittent/none misting toggles, battery 86, battery connector 88, at least one printed circuit board (PCB) 92, which may be two PCBs comprising a battery PCB and a motor control and mister control PCB, battery level indicators 90, and power/misting setting indicators 94.

Battery 86 may be two 3.7v 5000 mah batteries wired in parallel for a total capacity of approximately 10,000 Mah or may be an alternative battery configuration so long the selected battery is rechargeable and can efficiently power motor assembly 78 for an extended duration in arid and/or humid environments. Battery 86 is in communication with PCB 92, or multiple PCBs in alternative configurations, battery connector 88, and motor assembly 78. Battery connector 88 is a charger input and may be configured as a plurality of connectors, such as, but not limited to, USB 2.0, USB 3.0, Micro USB, Thunderbolt®, or like alternatives, such that connector 88 may be used to connect battery 86 to a power source to charge battery 86, and/or power motor assembly 78 if battery 86 has no charge.

Plurality of inputs 84 are in communication with at least one PCB 92 such that PCB 92 is in communication with motor assembly 78 and battery 86, whereas plurality of inputs 84 control motor assembly 78 and thus the speed of fan 36. In a preferred embodiment, PCB 92 is also in communication with sonic disk assembly 32 (see FIGS. 6A through 6C, infra) and controls atomization (misting) of water from the sonic disk assembly by selectably, via plurality of inputs 84, communicating an electrical current to the sonic disk assembly. In some embodiments, PCB 92 may also include a buzzer or alarm thereon, which may be configured to make a noise when plurality of inputs 84 are actuated and/or when connector 88 is in communication with a power source.

As such, one having ordinary skill in the art will appreciate that control board 82 will have a microcontroller being able to control communications from plurality of inputs 84 to the various aforementioned components, turn of the sonic disk assembly in response to a communication received therefrom, toggle indicator lights in response to power on/off, fan speed settings, misting control settings of the sonic disk assembly, control a buzzer, etc. As such, any capable microcontroller now known, or hereinafter developed, is intended within the scope of the appending claims to provide the functionality of the present invention.

Figure 6A:
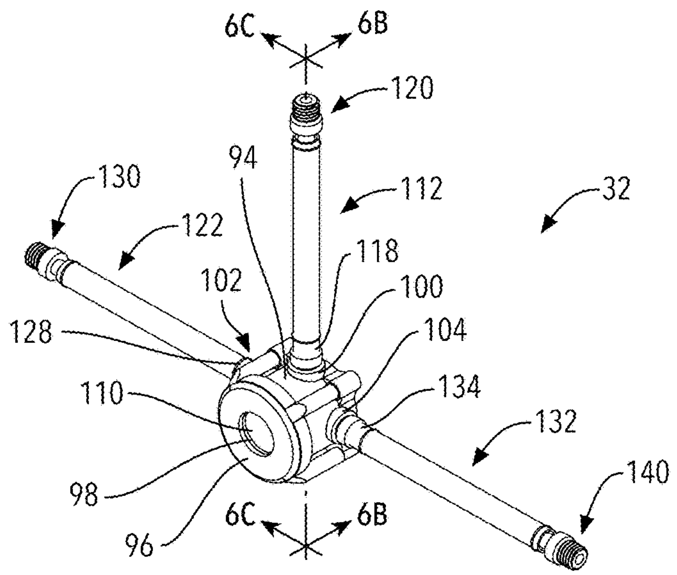
FIG. 6A is a perspective view of the sonic disk assembly of the invention shown in FIG. 1A.
Figure 6B:
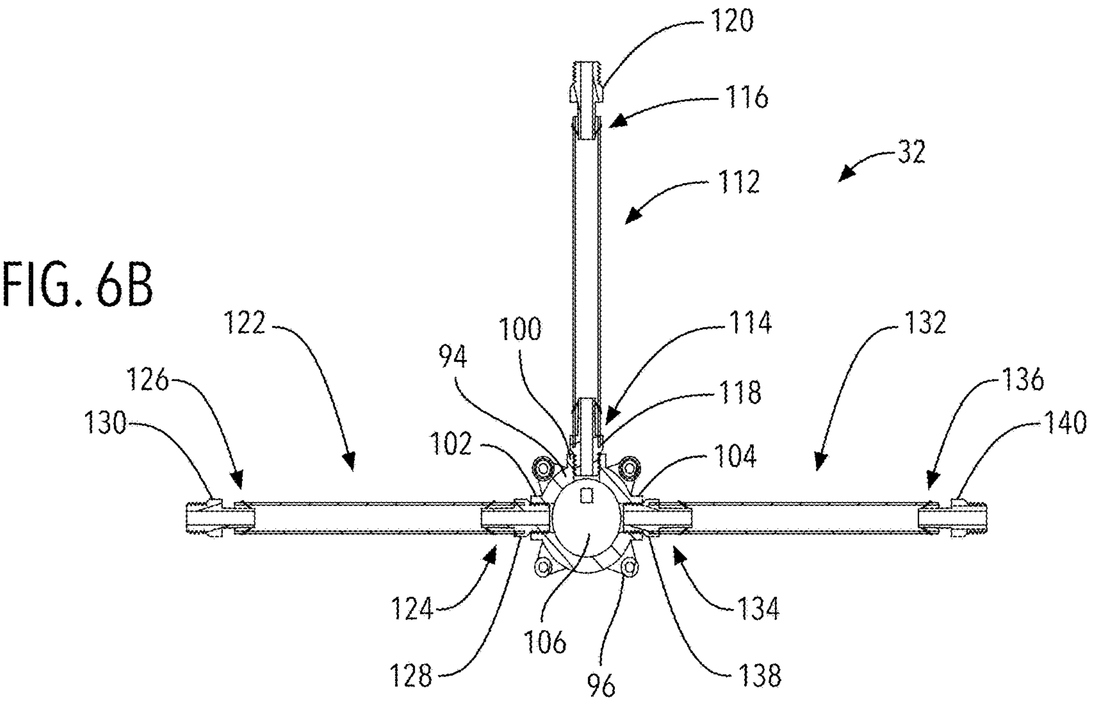
FIG. 6B is a cross-sectional view taken generally along line 6B-6B in FIG. 6A.
Figure 6C:
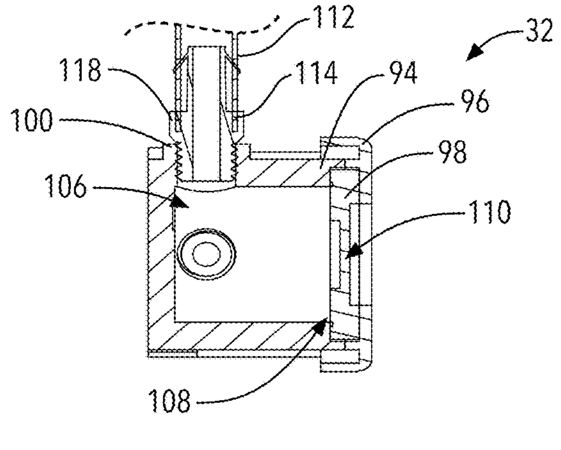
FIG. 6C is a cross-sectional view taken generally along line 6C-6C in FIG. 6A.

FIGS. 6A through 6C illustrate sonic disk assembly 32 isolated from the body, specifically a perspective view and a pair of cross-sectionals taken generally along lines 6B-6B and 6C-6C, respectively. In one possible embodiment, sonic disk assembly 32 includes body 94, cover 96, gasket 98 having sonic disk 110 therein, internal cavity 106 having first inlet 100, second inlet 102, and third inlet 104 in communication with internal cavity 106. Internal cavity 106 has opening 108 which cover 96, and gasket 98 within cover 96, seal. Conduits 112, 122, and 132 are arranged to engage inlets 100, 102, and 104, respectively. Conduit 112 includes ends 114 and 116 having connectors 118 and 120 thereon, respectively, where connector 118 removably engages inlet 100, via threading or other removable securement means that maintain a water-tight connection. Conduit 122 includes ends 124 and 126 having connectors 128 and 130 thereon, respectively, where connector 128 removably engages inlet 102, via threading or other removable securement means that maintain a water-tight connection. Conduit 132 includes ends 134 and 136 having connectors 138 and 140 thereon, respectively, where connector 134 removably engages inlet 104, via threading or other removable securement means that maintain a water-tight connection. Connectors 120, 130, and 140 are arranged to engage the outlets of the body (see FIG. 4B, outlets 46, 48, and 50 of upper section 20 of body 12 thereby fluidly connecting reservoir 42 and internal cavity 106) thereby allowing water to flow from within the reservoir of the body into internal cavity 106 of sonic disk assembly 32. Since body 94 and internal cavity 106 is generally arranged distally in relation to the outlets of the body, i.e., has a floor lower than the outlets, gravity and the weight of the water will continuously feed water into internal cavity 106 until the reservoir of the body is empty.

Sonic disk 110, which may be a piezoelectric atomizer, is arranged within gasket 98 such that a surface thereof is facing outwardly from opening 108 and a respective opposite surface is facing into internal cavity 106. Sonic disk 110, as discussed above, is in communication with control board 82 (see FIGS. 5A and 5B) such that when the respective input is actuated on control board 82, an electrical current is sent to sonic disk 110, thereby activating it. When sonic disk 110 is activated, water within internal cavity 106 that is in contact with disk 110 is atomized and the atomized water is then expelled through pores arranged substantially within the center of disk 110, which pores are of such a size that, when water is not atomized, it cannot pass through disk 110, i.e., when disk 110 is not activated, water will not pass therethrough. In a non-limiting example, disk 110 may be a piezoelectric atomizer and may receive 113 kHz current from the control board upon actuation of an input, discussed supra. Additionally, disk 110 may receive pulses, or intermittent electrical current, thereby atomizing water in intervals, thus preserving the water level within the reservoir of the body.

In some embodiments, internal cavity 106 of sonic disk assembly 32 may have a water sensor in communication with the control board, which sensor will automatically halt electric current being sent to disk 110 when water is no longer detected within internal cavity 106.

Figure 7B:
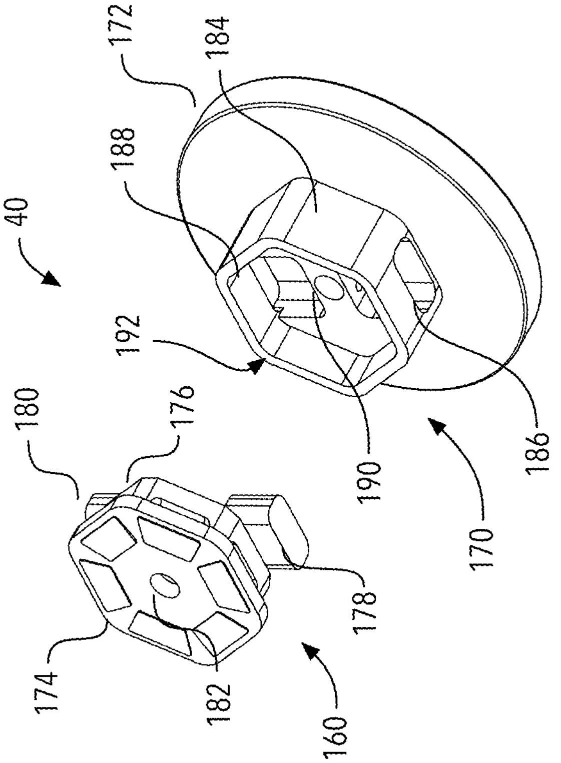
FIGS. 7A and 7B illustrate exploded views of the mounting assembly of the invention shown in FIG. 1A.
Figure 7C:
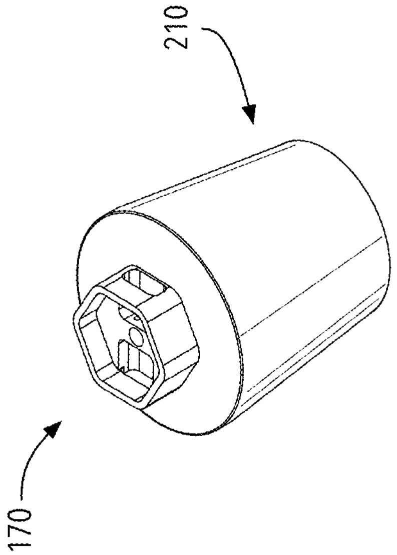
FIG. 7C illustrates a cup-holder mount embodiment of the mounting assembly.
Figure 7A:
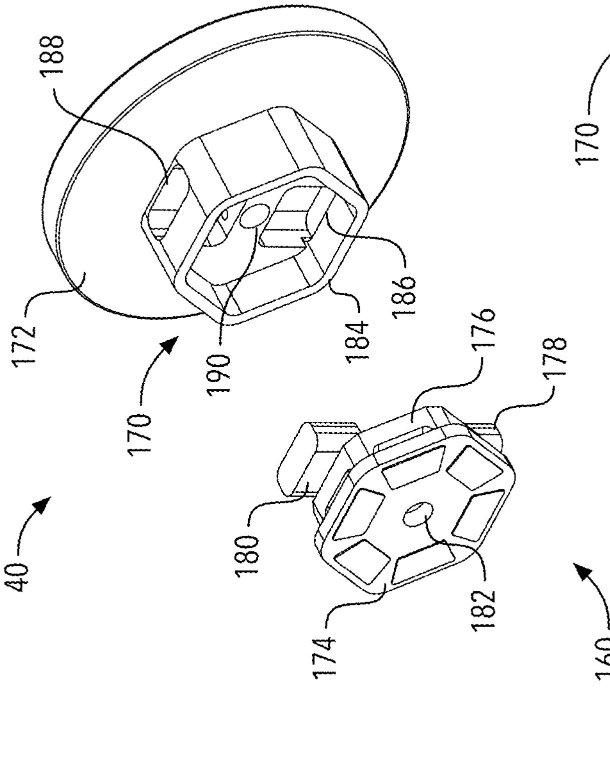

FIGS. 7A and 7B illustrate exploded views of mounting device 40. Generally, mounting device 40 comprises connectors 160 and 170. Connector 160 is generally a base connector which is arranged to be secured to the mounting arm assembly (see FIGS. 1B, 2B, and 3) and may comprise mounting body 174, extension 176, tabs 178 and 180, and mounting aperture 182. Extension 176 protrudes from body 174 and has tabs 178 and 180 extending therefrom. Tabs 178 and 180 are springingly connected to extension 176, such that if force is applied to respective outer surfaces of the tabs in a radially inward direction towards mounting aperture 182, the configuration biases tabs 178 and 180 to apply an opposite force in the radial outward direction, in other words, tabs 178 and 180 are biased in the configuration shown and return to that position absent the aforementioned forces. Mounting aperture 182 may be used to accept a fastener therein allowing the mounting body to be connected to the mounting arm assembly. Connector 170 is generally an accessory connector, e.g., has magnet 172 attached thereto or has a clamp-like device attached thereto. Connector 170 may comprise mounting body 184, which may be an annular-like protrusion, hexagonal, etc., forming a wall surrounding mounting aperture 190 to create space 192 therein, tab apertures 186 and 188 disposed within the wall formed by body 184, and magnet 172—or an alternative mounting apparatus such as a clamp-like device.

Connector 160 is arranged to be removably engaged within connector 170. Specifically, when tabs 178 and 180 are depressed radially inward, body 174 can be inserted, at least partially, within space 192 of mounting body 184, where tabs 178 and 180 will release in a radially outward direction and be seated at least partially within tab apertures 186 and 188 once mounting body 174 is at least partially within space 192, thereby connecting connector 160 to connector 170. Similarly, if tabs 178 and 180 are depressed radially inward when resting at least partially within tab apertures 186 and 188, body 174 may be removed from space 192 of mounting body 184. In other words, the aforementioned configuration of the mounting device is a quick-release type connection.

In some arrangements, connector 170 may be fixedly secured to a plurality of different mounting elements, such as cup-holder body 210, as shown in FIG. 7C, or a body having a suction cup, or suction-cup like attachment apparatus, either directly, or in a movably-arranged manner, e.g., a ball-joint, pivotably, rotatably, etc. Cup-holder body 210 is arranged to be seated, at least partially, within a typical cup-holder that may be found in vehicles, such as golf-carts. Cup-holder body 210 may include weights and/or be weighted to prevent the body of the misting fan and mounting arm assembly from tipping and/or removing cup-holder body 210 from a respective cup holder when the portable misting fan is attached, via the mounting arm assembly, thereto.

A representative suction cup mounting that may accommodate connector 170 thereon, with or without a movable arm, is shown and described in U.S. Design Patent No. D688,726, issued Aug. 27, 2013, which design patent is incorporated by reference herein in its entirety.

Another possible representative cup-holder mount that may accommodate connector 170, with or without a pivotable mechanism extending therefrom, is shown and described in U.S. Pat. No. 10,576,905, issued Mar. 3, 2020, which patent is incorporated by reference herein in its entirety.

A possible representative clamp, or spring clamp mount, that may accommodate connector 170, is shown and described in U.S. Pat. No. 11,953,256, issued Apr. 9, 2024, which patent is incorporate by reference herein in its entirety.

Figure 1A:
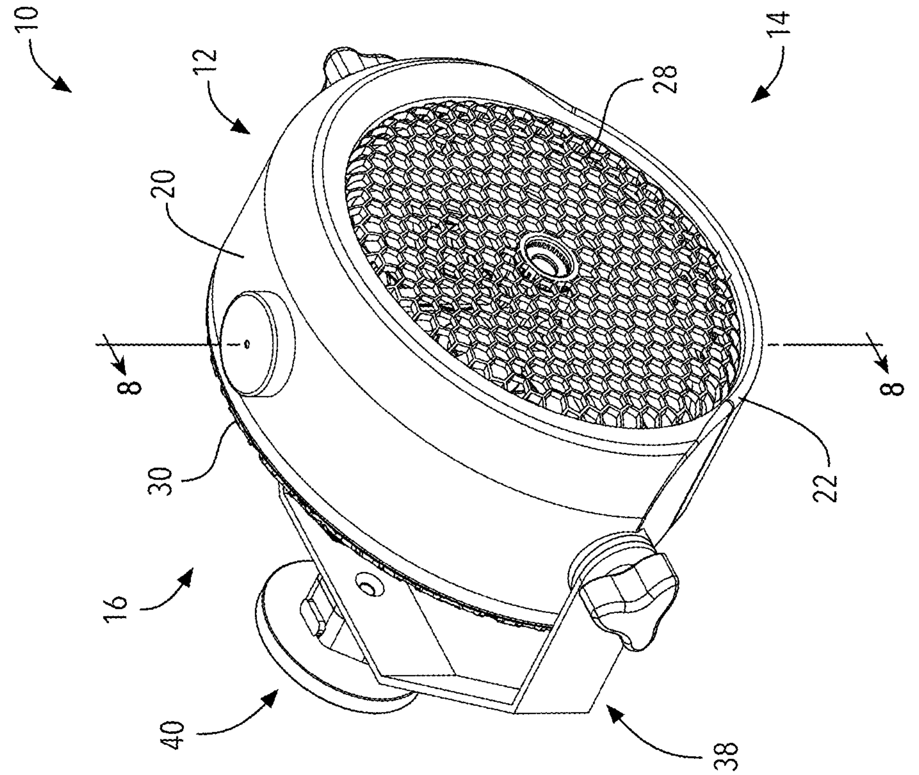
Figure 2B:
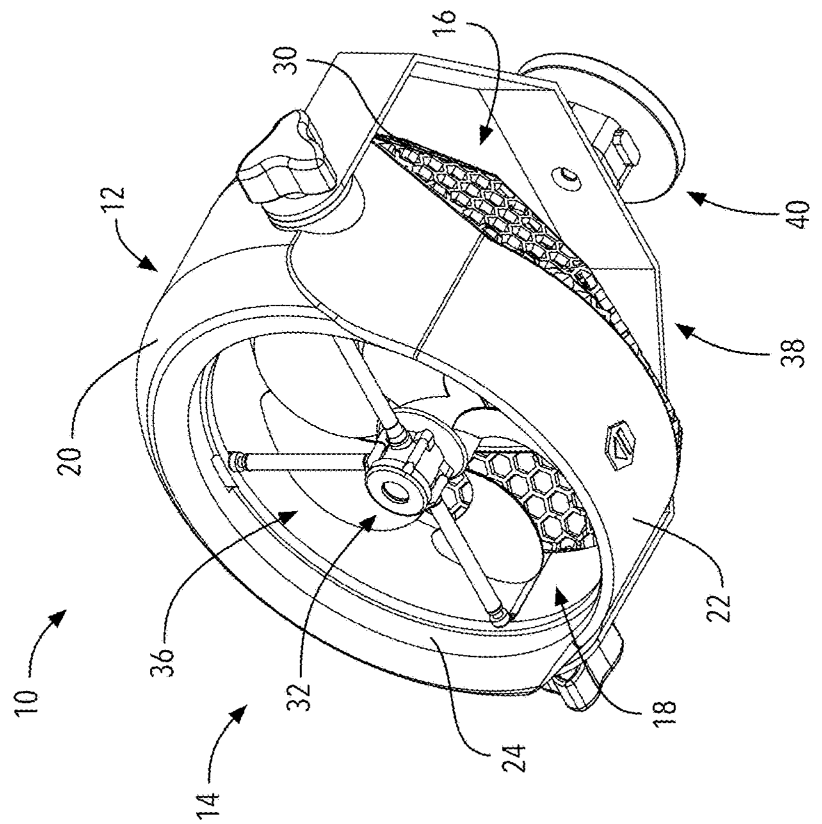
FIGS. 2A and 2B show perspective views of the invention shown in FIG. 1A with the front grate removed.
Figure 2A:
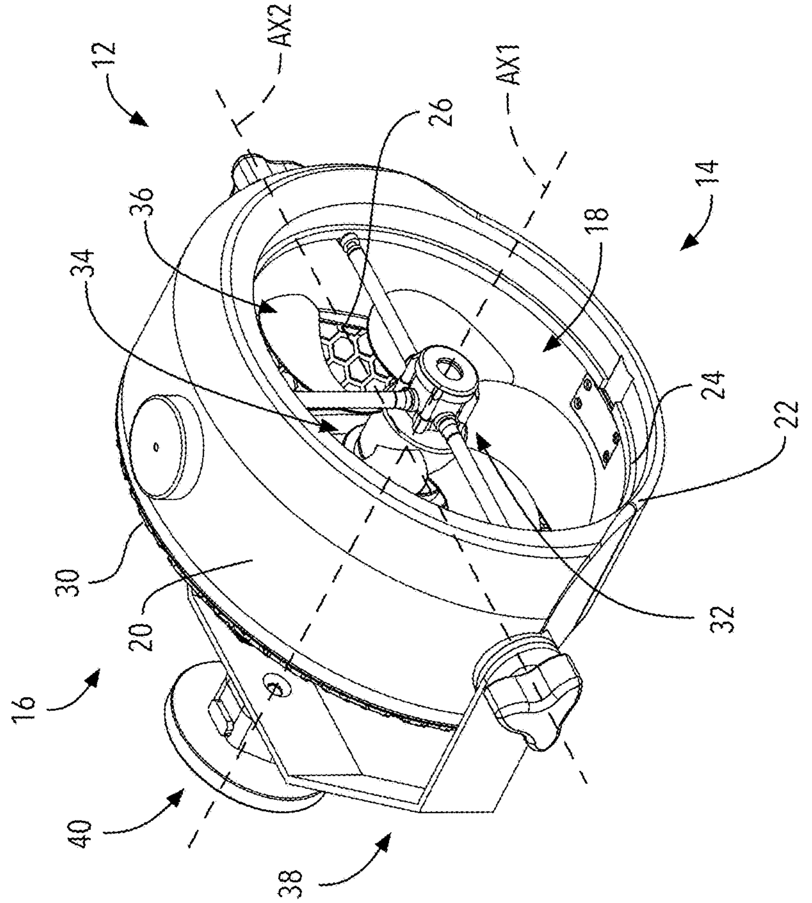
Figure 8:
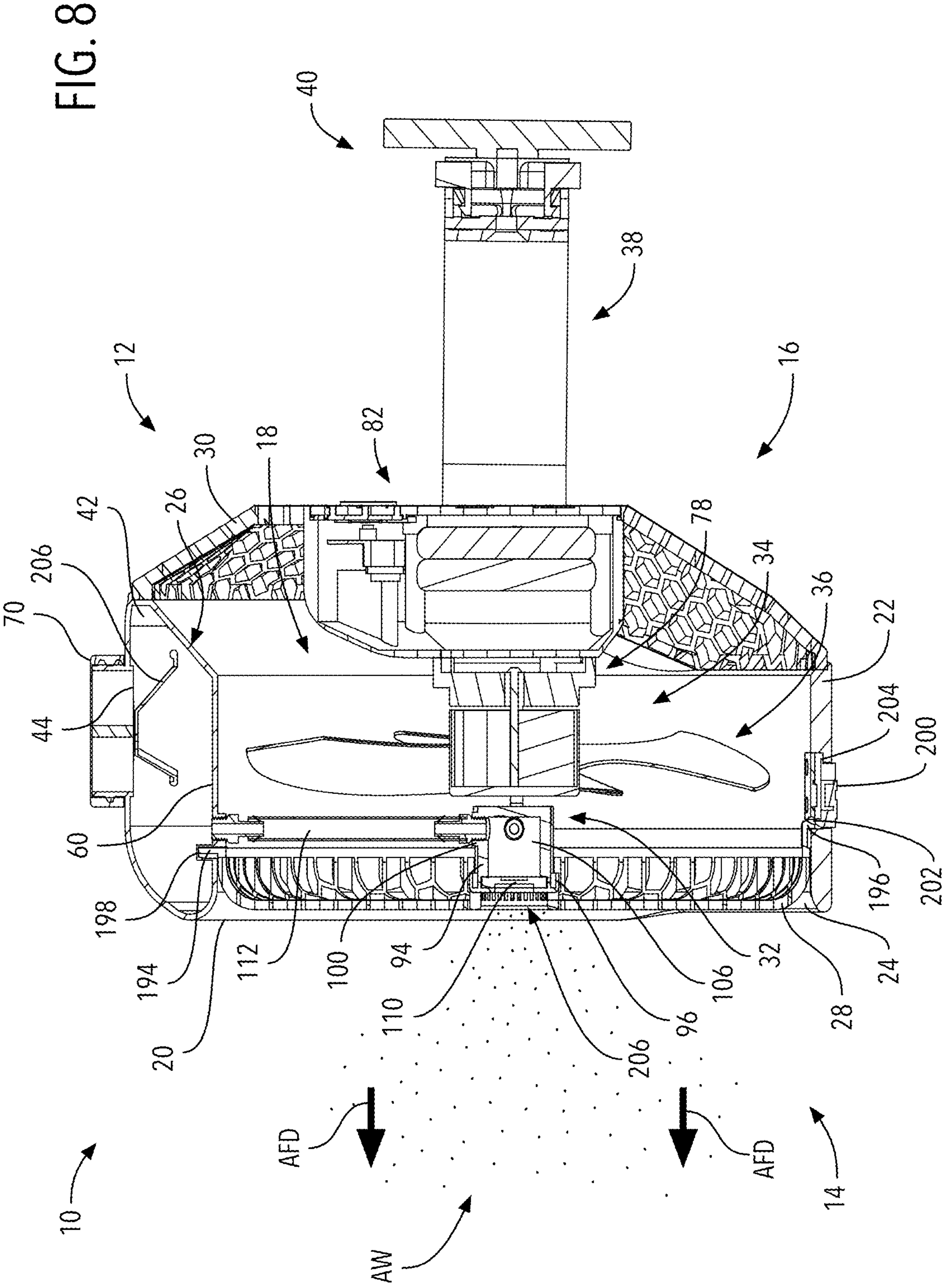
FIG. 8 is a cross-sectional view taken generally along line 8-8 in FIG. 1A; and, FIG. 9 is a high-level schematic of a representative control board and components.

FIG. 8 illustrates a cross-sectional view of portable misting fan 10 taken generally along line 8-8 in FIG. 1A. In some embodiments, faceplate or grate 28 is removably attached to both upper section 20 and lower section 22 of body 12 and has protrusion 194 extending therefrom proximate reservoir 42 and has protrusion 196 arranged opposite protrusion 194 extending in direction towards backplate or grate 30. Protrusion 194 resembles a tab or thin body which is arranged to be seated within slot 198 of upper section 20, which slot is closed but extends into reservoir floor 60. Protrusion 196 may be configured as a leaf spring with a hook-like end, thus protrusion 196 may move when pressure is applied on its terminal end. Protrusion 196 is arranged to be at least partially seated within release aperture 204 and abut retention tab 202 of release button 200, thereby frictionally securing protrusion 196 therein, i.e., frictionally securing protrusion 196 to lower section 22, such that the hook-like end of protrusion 196 also contacts an inner edge of release aperture 204 preventing protrusion 196 from being pulled out of release aperture 204 in a direction towards opening 24. Release button 200 is arranged to translate within release aperture 204 when force is applied thereon. When force is applied in a direction towards upper section 20 on release button 200, retention tab 202 pushes the hook-like end of protrusion 196 in a direction towards upper section 20 and out of release aperture 204, thereby allowing grate 28 to be pulling out of opening 24 and also allowing protrusion 194 to be removed from slot 198. This configuration allows grate 28 to be quickly removed from opening 24, allowing access to the components arranged within passageway 18, e.g., sonic disk assembly 32, fan 36, fan assembly 34, motor assembly 78, etc.

In other configurations, grate 28 may include dispensing aperture 206 arranged in a substantial center thereof. One or more of cover 96 or body 94 of sonic disk assembly 32 may be at least partially seated within dispensing aperture 206, thereby maintaining disk 110 in a substantially central location within dispensing aperture 206 to allow atomized water AW to be expelled therefrom and through dispensing aperture 206. When fan assembly 34 is activated, fan 36 produces air flow in air flow direction AFD which will disperse atomized water AW from disk 110—producing a water misting effect.

In some embodiments, cap 70 may include retainer clip 208 extending distally therefrom. Retainer clip 208 may be configured with a plurality of arms which extend past an internal diameter of proximal inlet 44 to keep cap 70 from being accidentally removed. The arms of retainer clip 208 may be semi-flexible, such that when cap 70 is pulled with force and in a direction away from proximal inlet 44, the arms will collapse in a radially inward direction, thereby allowing cap 70 to be removed.

Figure 9:
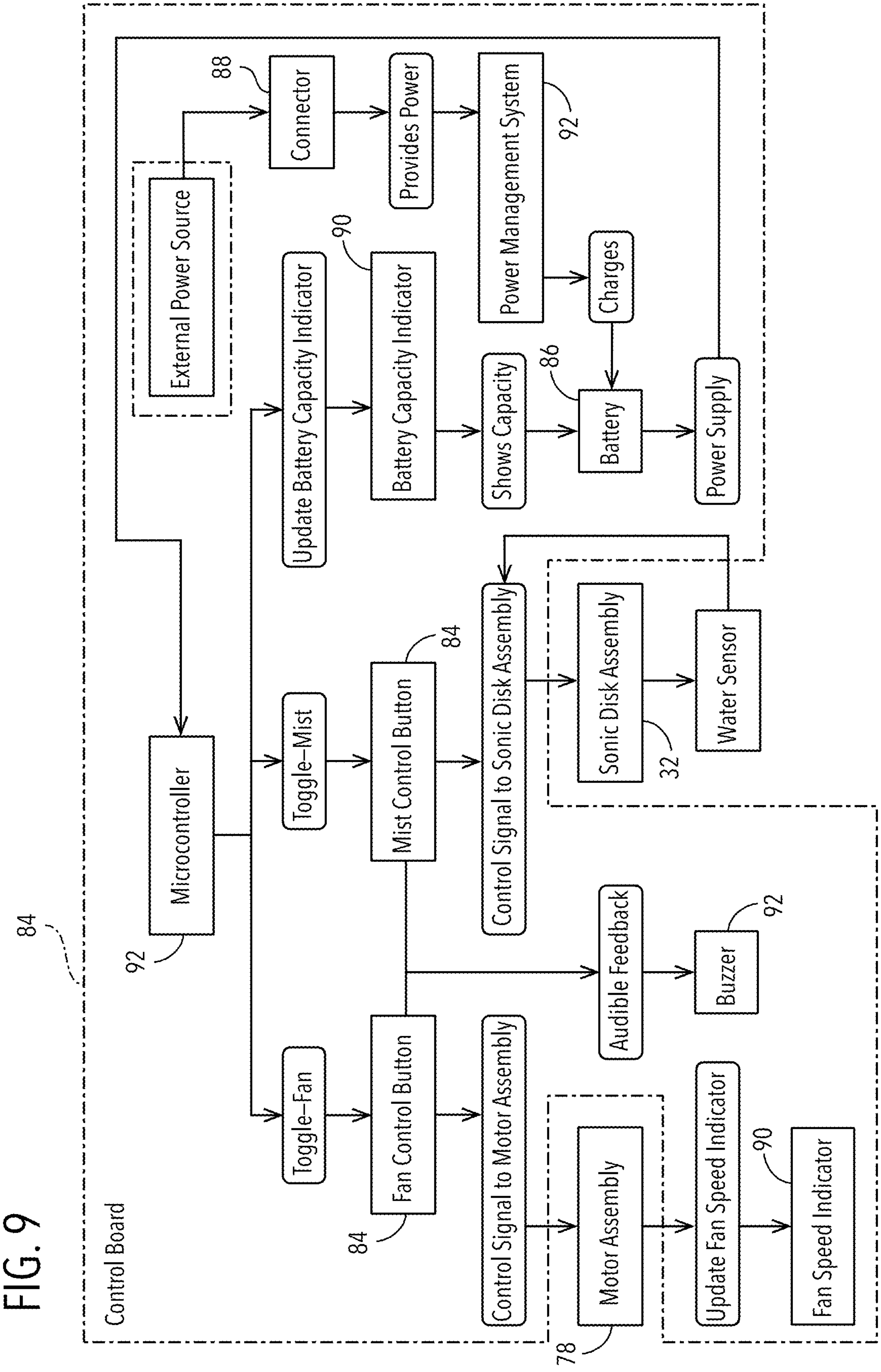

The following description should be taken in view of the aforementioned figures and FIG. 9. FIG. 9 high-level schematic of a representative control board and components of portable misting fan 10 that generally shows representative electrical communications, including electrical current (e.g., power) from control board 82 between the components of portable misting fan 10, e.g., motor assembly 78, sonic disk assembly 32, battery 86, battery connector 88, PCBs 92, indicators 90, etc. It should be appreciated that FIG. 9 is merely representative and one having ordinary skill in the art will appreciate that various combinations, alternatives, etc. may be possible to power and control the present invention, as such, FIG. 9 should not be considered restrictive on the scope of the appending claims.

Thusly, the embodiments shown and described are merely exemplary and various alternatives, combinations, omissions, of specific components, or foreseeable alternative components, understood by one having ordinary skill in the art, described in the present disclosure or within the field of the present disclosure, are intended to fall within the scope of the appending claims.

It will be appreciated that various aspects of the invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the claims.

REFERENCE NUMERALS

10 Portable misting fan
12 Body
14 Front end
16 Back end
18 Passageway
20 Upper section
22 Lower section
24 First opening
26 Second opening
28 First grate
30 Second grate
32 Sonic disk assembly
34 Fan assembly
36 Fan
38 Mounting arm assembly
40 Mounting device
42 Arcuate internal reservoir
44 Proximal inlet
46 First outlet
48 Second outlet
50 Third outlet
52 First mounting section
54 Second mounting section
56 Mouth
58 Threading
60 Reservoir floor
61 Upper surface
62 First distal inlet
64 Second distal inlet
66 First reservoir wall slope
68 Second reservoir wall slope
70 Cap
72 Internal end
74 External end
76 Aperture
78 Motor assembly
80 Cavity
82 Control board
84 Plurality of inputs
86 Battery
88 Battery connector
90 Plurality of indicators
92 PCBs
94 Body
96 Cover
98 Gasket
100 First inlet
102 Second inlet
104 Third inlet
106 Internal cavity
108 Opening
110 Disk
112 First conduit
114 End
116 End
118 Connector
120 Connector
122 Second conduit
124 End
126 End
128 Connector
130 Connector
132 Second conduit
134 End
136 End
138 Connector
140 Connector
150 First end
152 Second end
154 First arm
156 Second arm
158 Base
160 Connector
162 Mounting aperture 164 Mounting aperture
166 First threaded connector
168 Second threaded connector
170 Connector
172 Magnet
174 Mounting body
176 Extension
178 Tab
180 Tab
182 Mounting aperture
184 Mounting body
186 Tab aperture
188 Tab aperture
190 Attachment aperture
192 Space
194 Protrusion
196 Protrusion
198 Slot
200 Release button
202 Retention tab
204 Release aperture
206 Dispensing aperture
208 Retainer clip
210 Cup-holder body
AFD Air flow direction
AW Atomized water
AX1 First axis
AX2 Second axis

What is claimed is:

1. A portable misting fan, comprising:

a body having interconnected upper and lower sections thereby circumferentially defining a passageway with respective open ends therebetween, said upper section comprising an arcuate internal reservoir therein, said internal reservoir having an inlet and at least one outlet;

a fan assembly arranged at least partially within said passageway;

a sonic disk assembly in communication with said at least one outlet and positioned in front of said fan assembly;

a mounting arm pivotably connected to said body about an axis perpendicularly arranged with respect to said open ends of said passageway, wherein said sonic disk assembly is adapted to selectably atomize and disperse water, communicated from said internal reservoir, therefrom in one or more of a continuous or intermittent manner;

a controller in communication with said fan assembly and said sonic disk assembly, said controller adapted to toggle power to said fan assembly and to toggle activation of said sonic disk assembly; and, a perforated grate attached to one of said open ends of said passageway distally arranged relative to said sonic disk assembly, said perforated grate having said fan assembly and said controller arranged therein.

2. The portable misting fan recited in claim 1 further comprising a battery in communication with said fan assembly.

3. The portable misting fan recited in claim 1 further comprising mounting means removably connected to a distal end of said mounting arm.

4. The portable misting fan recited in claim 3, wherein said mounting means comprises one or more of a movably connected clamp, a movable connected suction cup, a magnet, or a movably connected cup-holder mount.

5. The portable misting fan recited in claim 1 further comprising a first, second, and third outlet, which aforementioned outlets are in communication with said sonic disk assembly.

6. The portable misting fan recited in claim 1 further comprising at least one perforated grate removably attached to one or more of each of said open ends of said passageway.

7. The portable misting fan recited in claim 1 further comprising a battery in communication with said controller, said fan assembly, and said sonic disk assembly.

8. The portable misting recited in claim 3, wherein said mounting means comprises:

a first connector secured to said distal end of said mounting arm, said first connector comprising a mounting body having one or more spring-biased tabs extending therefrom; and, a second connector comprising a wall defining a space and having one or more tab apertures, wherein said first connector is arranged to be removably engaged within said space of said second connector such that said one or more spring-biased tabs engage said one or more tab apertures, thereby forming a quick-release connection.

9. The portable misting fan recited in claim 8, wherein said second connector is attached to one or more of a clamp, a suction cup, a magnet, or a cup-holder mount.

10. The portable misting fan recited in claim 1, wherein said arcuate internal reservoir comprises:

a reservoir floor;

an upper surface; and, a first reservoir wall slope and a second reservoir wall slope extending from said upper surface, wherein said reservoir floor and said first and second reservoir wall slopes define at least one funnel configured to direct water towards said at least one outlet.

11. The portable misting fan recited in claim 1, further comprising a water sensor in communication with said controller, wherein said water sensor is arranged to detect the presence of water for said sonic disk assembly, and wherein said controller is further adapted to halt activation of said sonic disk assembly when said water sensor no longer detects the presence of water.

12. The portable misting fan recited in claim 1, further comprising a buzzer in communication with said controller, wherein said controller is further adapted to cause said buzzer to provide an audible feedback in response to an actuation of one or more user inputs.

13. The portable misting fan recited in claim 1, wherein said controller is in communication with a power management system, said power management system being configured to manage power from a battery and an external power source.

14. The portable misting fan recited in claim 13, further comprising a battery capacity indicator in communication with said power management system, wherein said power management system is configured to cause said battery capacity indicator to display a status of said battery.

* * * * *